(12) United States Patent
Gulati et al.

(10) Patent No.: US 11,611,853 B2
(45) Date of Patent: Mar. 21, 2023

(54) SIDELINK GROUP MANAGEMENT FOR TRANSMIT POWER CONTROLLED GROUP COMMUNICATIONS

(71) Applicant: QUALCOMM Incorporated, San Diego, CA (US)

(72) Inventors: Kapil Gulati, Belle Mead, NJ (US); Hong Cheng, Basking Ridge, NJ (US); Jung Ho Ryu, Fort Lee, NJ (US); Sony Akkarakaran, Poway, CA (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/217,836

(22) Filed: Mar. 30, 2021

(65) Prior Publication Data
US 2021/0306815 A1    Sep. 30, 2021

Related U.S. Application Data

(60) Provisional application No. 63/003,088, filed on Mar. 31, 2020.

(51) Int. Cl.
*H04W 4/06* (2009.01)
*H04W 76/14* (2018.01)
(Continued)

(52) U.S. Cl.
CPC .............. *H04W 4/06* (2013.01); *H04W 4/12* (2013.01); *H04W 48/08* (2013.01); *H04W 52/362* (2013.01)

(58) Field of Classification Search
CPC ......... H04W 48/08; H04W 4/06; H04W 4/12; H04W 4/40; H04W 52/362; H04W 76/14; H04W 88/04; H04W 92/18
(Continued)

(56) References Cited

U.S. PATENT DOCUMENTS

2020/0022089 A1    1/2020  Guo
2020/0092685 A1*   3/2020  Fehrenbach ......... H04B 7/2606
(Continued)

FOREIGN PATENT DOCUMENTS

WO    2020064304 A1    4/2020
WO    2021021524 A1    2/2021
WO    2021026022 A1    2/2021

OTHER PUBLICATIONS

International Search Report and Wri 1 1 En Opinion - PCT/US2021/025187 - ISA/EPO - 2021-06-28 K203050WO).

*Primary Examiner* — Andrew Wendell
(74) *Attorney, Agent, or Firm* — Muncy, Geissler, Olds and Lowe

(57) ABSTRACT

Disclosed are techniques for wireless communication. In an aspect, a user equipment (UE) participating in a sidelink communications group communicates with one or more member UEs of the sidelink communications group, and transmits group presence announcement messages for the sidelink communications group based on a determination, based on communicating with the one or more member UEs, of at least a transmit power for the group presence announcement messages and that the UE is expected to transmit the group presence announcement messages for the sidelink communications group.

30 Claims, 7 Drawing Sheets

(51) Int. Cl.
*H04W 4/12* (2009.01)
*H04W 52/36* (2009.01)
*H04W 48/08* (2009.01)

(58) Field of Classification Search
USPC .......................................................... 455/522
See application file for complete search history.

(56) References Cited

U.S. PATENT DOCUMENTS

| | | | |
|---|---|---|---|
| 2020/0163005 A1* | 5/2020 | Rao ....................... | H04W 76/14 |
| 2021/0037476 A1* | 2/2021 | Ryu ..................... | H04W 52/383 |
| 2021/0051614 A1* | 2/2021 | Gulati .................... | H04L 5/0053 |
| 2021/0127403 A1* | 4/2021 | Ryu ..................... | H04W 72/046 |
| 2021/0212025 A1* | 7/2021 | Selvanesan ....... | H04W 72/0446 |
| 2021/0243790 A1* | 8/2021 | Ji .......................... | H04L 1/1896 |
| 2021/0289473 A1* | 9/2021 | Chae ..................... | H04L 1/1642 |
| 2021/0345244 A1* | 11/2021 | Raghavan ......... | H04W 52/0229 |
| 2022/0030519 A1* | 1/2022 | Zhou .................. | H04W 72/005 |
| 2022/0295564 A1* | 9/2022 | Cao ................... | H04W 74/0833 |

* cited by examiner

SIDELINK GROUP MANAGEMENT FOR TRANSMIT POWER CONTROLLED GROUP COMMUNICATIONS

CROSS-REFERENCE TO RELATED APPLICATIONS

The present application for patent claims the benefit of U.S. Provisional Application No. 63/003,088, entitled "SIDELINK GROUP MANAGEMENT FOR TRANSMIT POWER CONTROLLED GROUP COMMUNICATIONS," filed Mar. 31, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for wireless communication performed by a user equipment (UE) participating in a sidelink communications group includes communicating with one or more member UEs of the sidelink communications group; and transmitting group presence announcement messages for the sidelink communications group based on a determination, based on communicating with the one or more member UEs, of at least a transmit power for the group presence announcement messages and that the UE is expected to transmit the group presence announcement messages for the sidelink communications group.

In an aspect, a user equipment (UE) includes a memory; a communication interface; and at least one processor communicatively coupled to the memory and the communication interface, the at least one processor configured to: communicate with one or more member UEs of a sidelink communications group; and cause the communication interface to transmit group presence announcement messages for the sidelink communications group based on a determination, based on communicating with the one or more member UEs, of at least a transmit power for the group presence announcement messages and that the UE is expected to transmit the group presence announcement messages for the sidelink communications group.

In an aspect, a user equipment (UE) includes means for communicating with one or more member UEs of a sidelink communications group; and means for transmitting group presence announcement messages for the sidelink communications group based on a determination, based on communicating with the one or more member UEs, of at least a transmit power for the group presence announcement messages and that the UE is expected to transmit the group presence announcement messages for the sidelink communications group.

In an aspect, a non-transitory computer-readable medium stores computer-executable instructions that, when executed by a user equipment (UE), cause the UE to: communicate with one or more member UEs of a sidelink communications group; and transmit group presence announcement messages for the sidelink communications group based on a determination, based on communicating with the one or more member UEs, of at least a transmit power for the group presence announcement messages and that the UE is expected to transmit the group presence announcement messages for the sidelink communications group.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
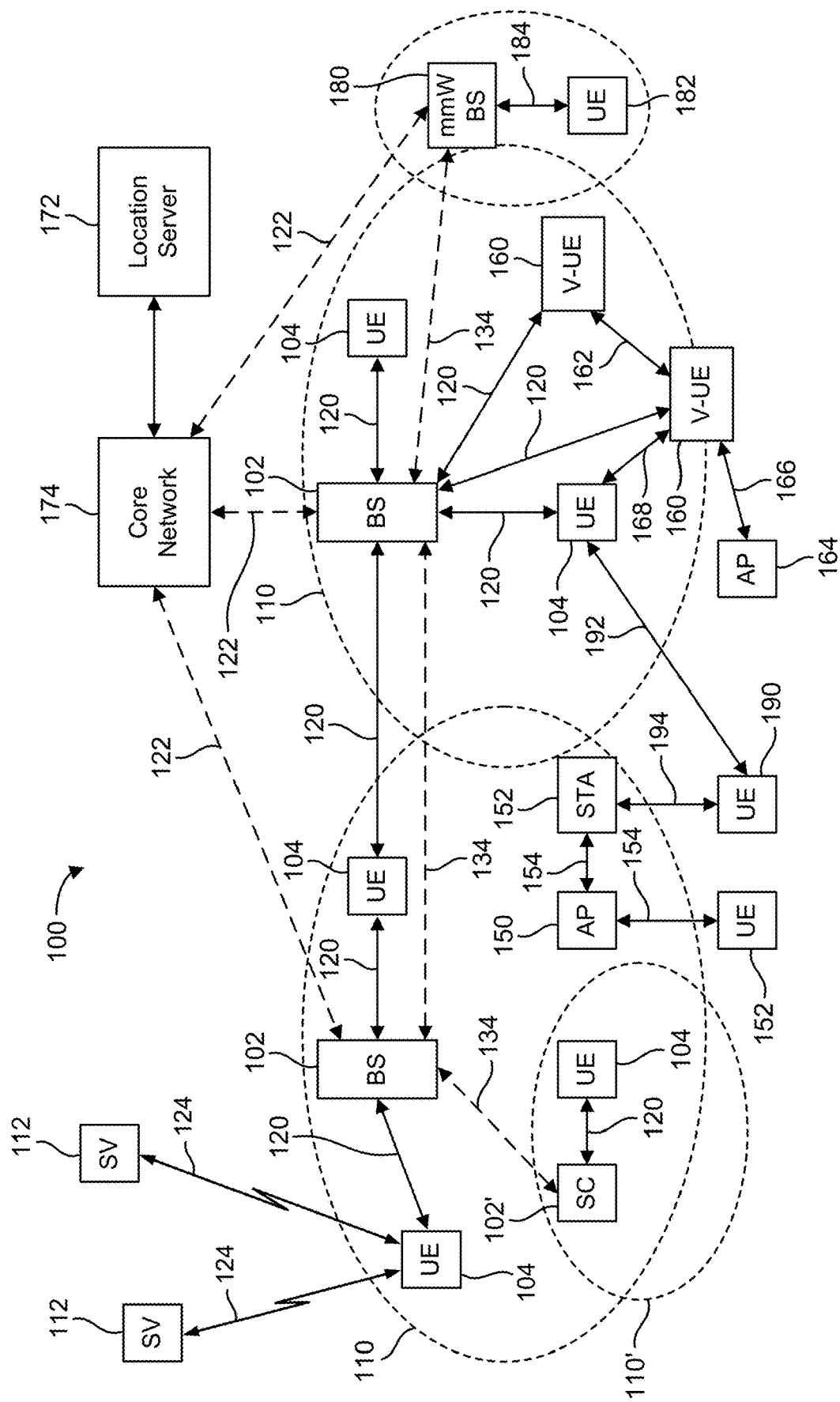
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
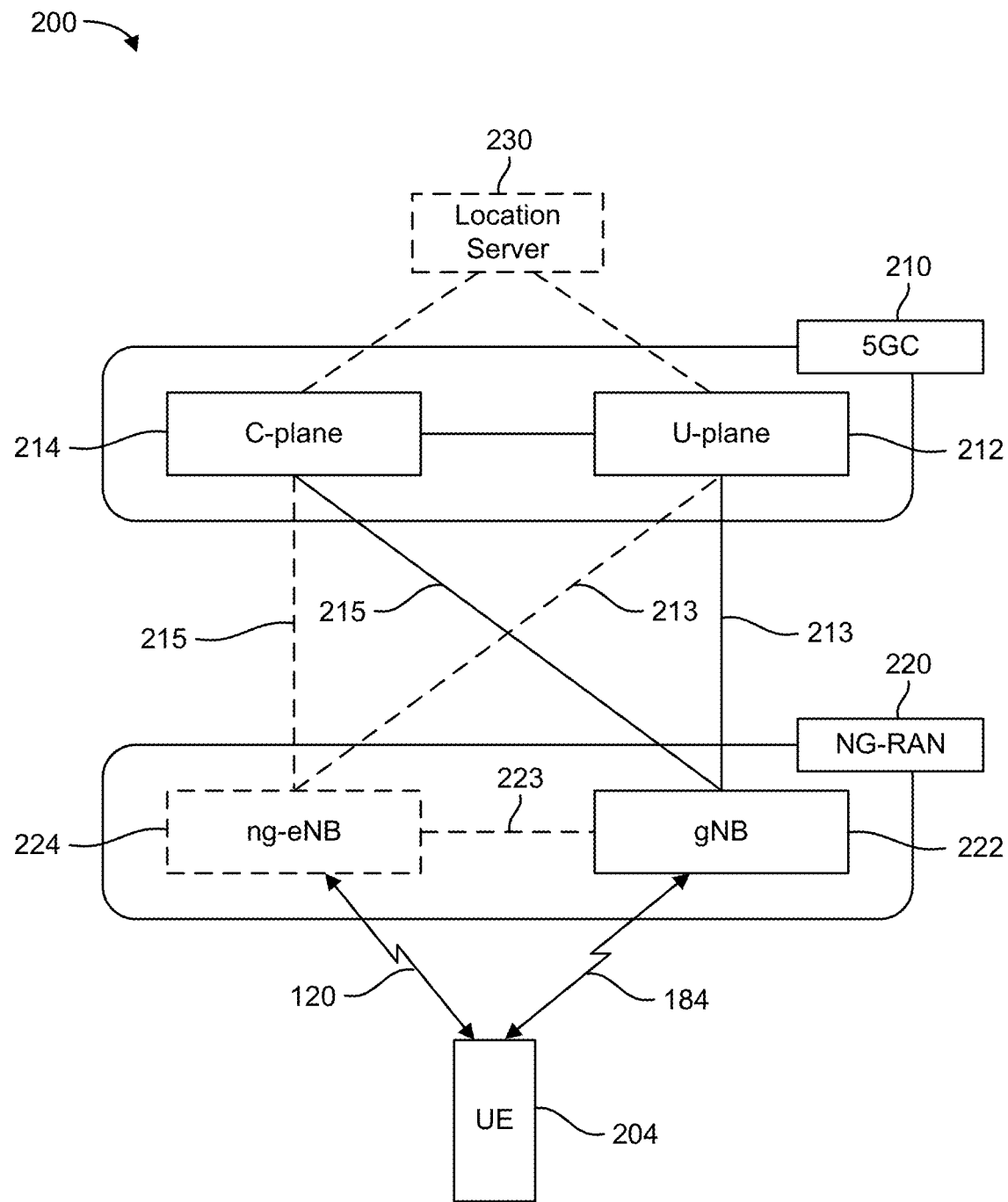
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
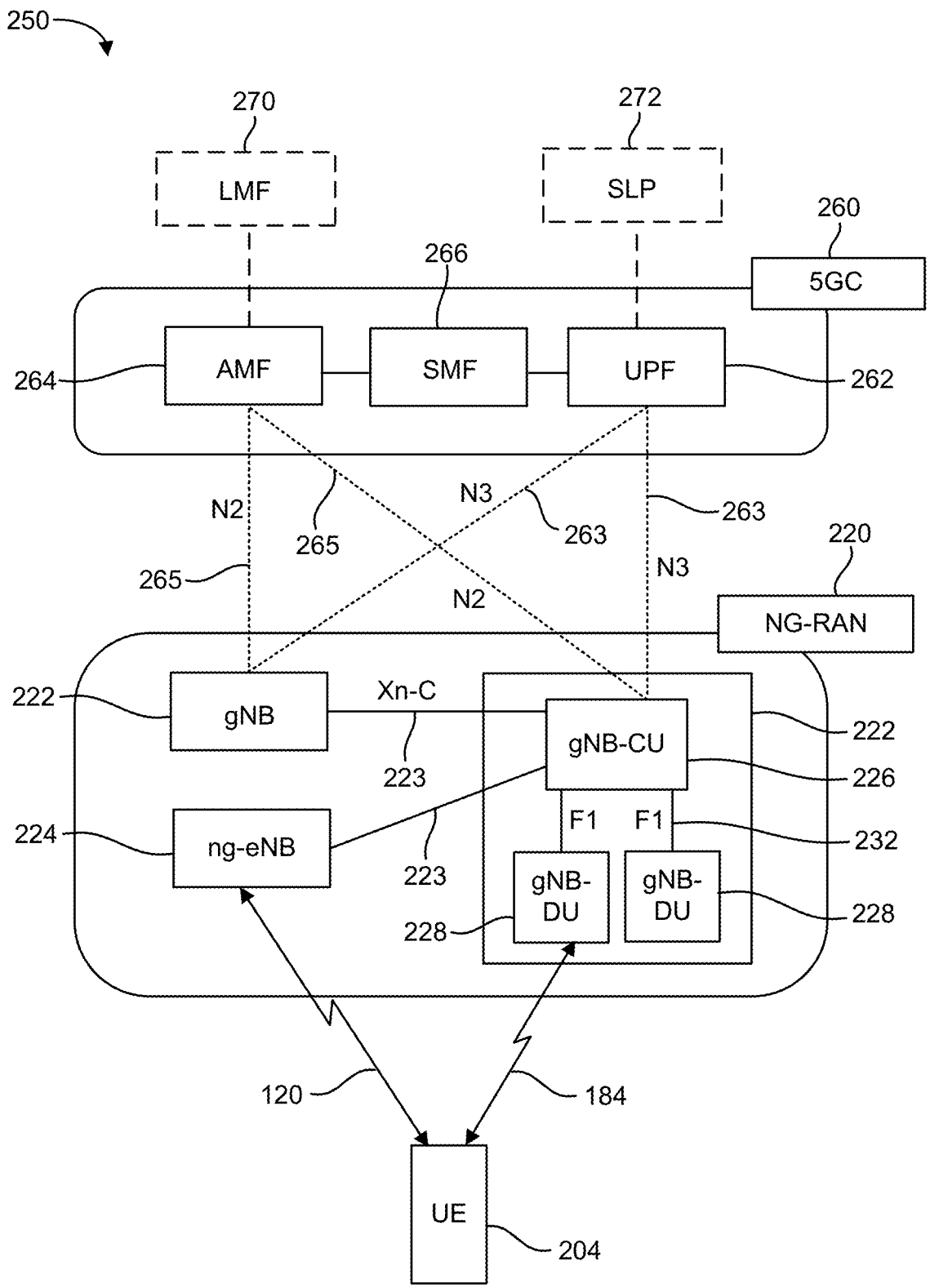

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3:
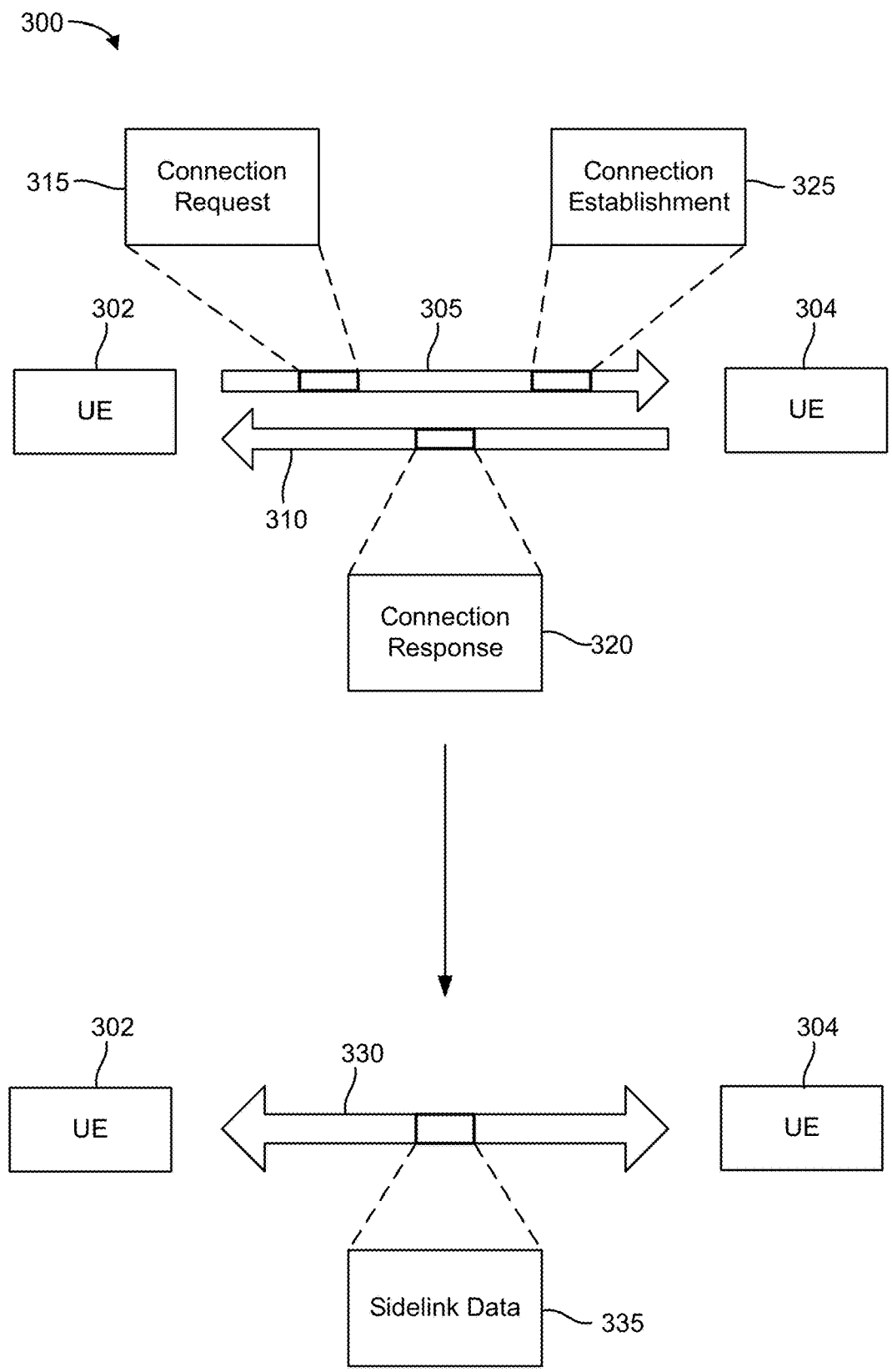
FIG. 3 illustrates an example of a wireless communications system that supports unicast sidelink establishment, according to aspects of the disclosure.

FIG. 3 illustrates an example of a wireless communications system 300 that supports wireless unicast sidelink establishment, according to aspects of the disclosure. In some examples, wireless communications system 300 may implement aspects of wireless communications systems 100, 200, and 250. Wireless communications system 300 may include a first UE 302 and a second UE 304, which may be examples of any of the UEs described herein. As specific examples, UEs 302 and 304 may correspond to V-UEs 160 in FIG. 1, UE 190 and UE 104 in FIG. 1 connected over D2D P2P link 192, or UEs 204 in FIGS. 2A and 2B.

In the example of FIG. 3, the UE 302 may attempt to establish a unicast connection over a sidelink with the UE 304, which may be a V2X sidelink between the UE 302 and UE 304. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 302 may be referred to as an initiating UE that initiates the sidelink connection procedure, and the UE 304 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 302 and UE 304. For example, a transmission and reception capability matching may be negotiated between the UE 302 and UE 304. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 302 and UE 304. Additionally, a security association may be established between UE 302 and UE 304 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 302 and UE 304.

In some cases, UE 304 may create a service announcement (e.g., a service capability message) to transmit over a cellular network (e.g., cV2X) to assist the sidelink connection establishment. Conventionally, UE 302 may identify and locate candidates for sidelink communications based on a basic service message (BSM) broadcasted unencrypted by nearby UEs (e.g., UE 304). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 302 is able to detect the BSM(s). Accordingly, the service announcement transmitted by UE 304 and other nearby UEs (e.g., a discovery signal) may be an upper layer signal and broadcasted (e.g., in an NR sidelink broadcast). In some cases, the UE 304 may include one or more parameters for itself in the service announcement, including connection parameters and/or capabilities it possesses. The UE 302 may then monitor for and receive the broadcasted service announcement to identify potential UEs for corresponding sidelink connections. In some cases, the UE 302 may identify the potential UEs based on the capabilities each UE indicates in their respective service announcements.

The service announcement may include information to assist the UE 302 (e.g., or any initiating UE) to identify the UE transmitting the service announcement (UE 304 in the example of FIG. 3). For example, the service announcement may include channel information where direct communication requests may be sent. In some cases, the channel information may be RAT-specific (e.g., specific to LTE or NR) and may include a resource pool within which UE 302 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 302 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 304 in the example of FIG. 3), the initiating UE (UE 302 in the example of FIG. 3) may transmit a connection request 315 to the identified target UE 304. In some cases, the connection request 315 may be a first RRC message transmitted by the UE 302 to request a unicast connection with the UE 304 (e.g., an "RRCDirectConnectionSetupRequest" message). For example, the unicast connection may utilize the PC5 interface for the sidelink, and the connection request 315 may be an RRC connection setup request message. Additionally, the UE 302 may use a sidelink signaling radio bearer 305 to transport the connection request 315.

After receiving the connection request 315, the UE 304 may determine whether to accept or reject the connection request 315. The UE 304 may base this determination on a transmission/reception capability, an ability to accommodate the unicast connection over the sidelink, a particular service indicated for the unicast connection, the contents to be transmitted over the unicast connection, or a combination thereof. For example, if the UE 302 wants to use a first RAT to transmit or receive data, but the UE 304 does not support the first RAT, then the UE 304 may reject the connection request 315. Additionally or alternatively, the UE 304 may reject the connection request 315 based on being unable to accommodate the unicast connection over the sidelink due to limited radio resources, a scheduling issue, etc. Accordingly, the UE 304 may transmit an indication of whether the request is accepted or rejected in a connection response 320. Similar to the UE 302 and the connection request 315, the UE 304 may use a sidelink signaling radio bearer 310 to transport the connection response 320. Additionally, the connection response 320 may be a second RRC message transmitted by the UE 304 in response to the connection request 315 (e.g., an "RRCDirectConnectionResponse" message).

In some cases, sidelink signaling radio bearers 305 and 310 may be the same sidelink signaling radio bearer or may be separate sidelink signaling radio bearers. Accordingly, a radio link control (RLC) layer acknowledged mode (AM) may be used for sidelink signaling radio bearers 305 and 310. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 320 indicates that the UE 304 accepted the connection request 315, the UE 302 may then transmit a connection establishment 325 message on the sidelink signaling radio bearer 305 to indicate that the unicast connection setup is complete. In some cases, the connection establishment 325 may be a third RRC message (e.g., an "RRCDirectConnectionSetupComplete" message). Each of the connection request 315, the connection response 320, and the connection establishment 325 may use a basic capability when being transported from one UE to the other UE to enable each UE to be able to receive and decode the corresponding transmission (e.g., the RRC messages).

Additionally, identifiers may be used for each of the connection request 315, the connection response 320, and the connection establishment 325. For example, the identifiers may indicate which UE 302/304 is transmitting which message and/or for which UE 302/304 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 315 and/or the connection response 320 for UE 302 and/or UE 304, respectively, to enable negotiation of corresponding AS layer parameters for the unicast connection. For example, the UE 302 and/or UE 304 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 302 and/or UE 304 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 302 and/or UE 304 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 302 and/or UE 304 may include PHY layer parameters when establishing the unicast connection to set a PHY layer context for the unicast connection. For example, the PHY layer context may indicate a transmission format (unless transmission profiles are included for each UE 302/304) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 325 message is transmitted). Before a security association (e.g., security context) is established between the UE 302 and UE 304, the sidelink signaling radio bearers 305 and 310 may not be protected. After a security association is established, the sidelink signaling radio bearers 305 and 310 may be protected. Accordingly, the security context may enable secure data transmissions over the unicast connection and the sidelink signaling radio bearers 305 and 310. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 304 may base its decision on whether to accept or reject the connection request 315 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 302 and UE 304 may communicate using the unicast connection over a sidelink 330, where sidelink data 335 is transmitted between the two UEs 302 and 304. The sidelink 330 may correspond to sidelinks 162 and/or 168 in FIG. 1. In some cases, the sidelink data 335 may include RRC messages transmitted between the two UEs 302 and 304. To maintain this unicast connection on sidelink 330, UE 302 and/or UE 304 may transmit a keep alive message (e.g., "RRCDirectLinkAlive" message, a fourth RRC message, etc.). In some cases, the keep alive message may be triggered periodically or on-demand (e.g., event-triggered). Accordingly, the triggering and transmission of the keep alive message may be invoked by UE 302 or by both UE 302 and UE 304. Additionally or alternatively, a MAC control element (CE) (e.g., defined over sidelink 330) may be used to monitor the status of the unicast connection on sidelink 330 and maintain the connection. When the unicast connection is no longer needed (e.g., UE 302 travels far enough away from UE 304), either UE 302 and/or UE 304 may start a release procedure to drop the unicast connection over sidelink 330. Accordingly, subsequent RRC messages may not be transmitted between UE 302 and UE 304 on the unicast connection.

Figure 4:
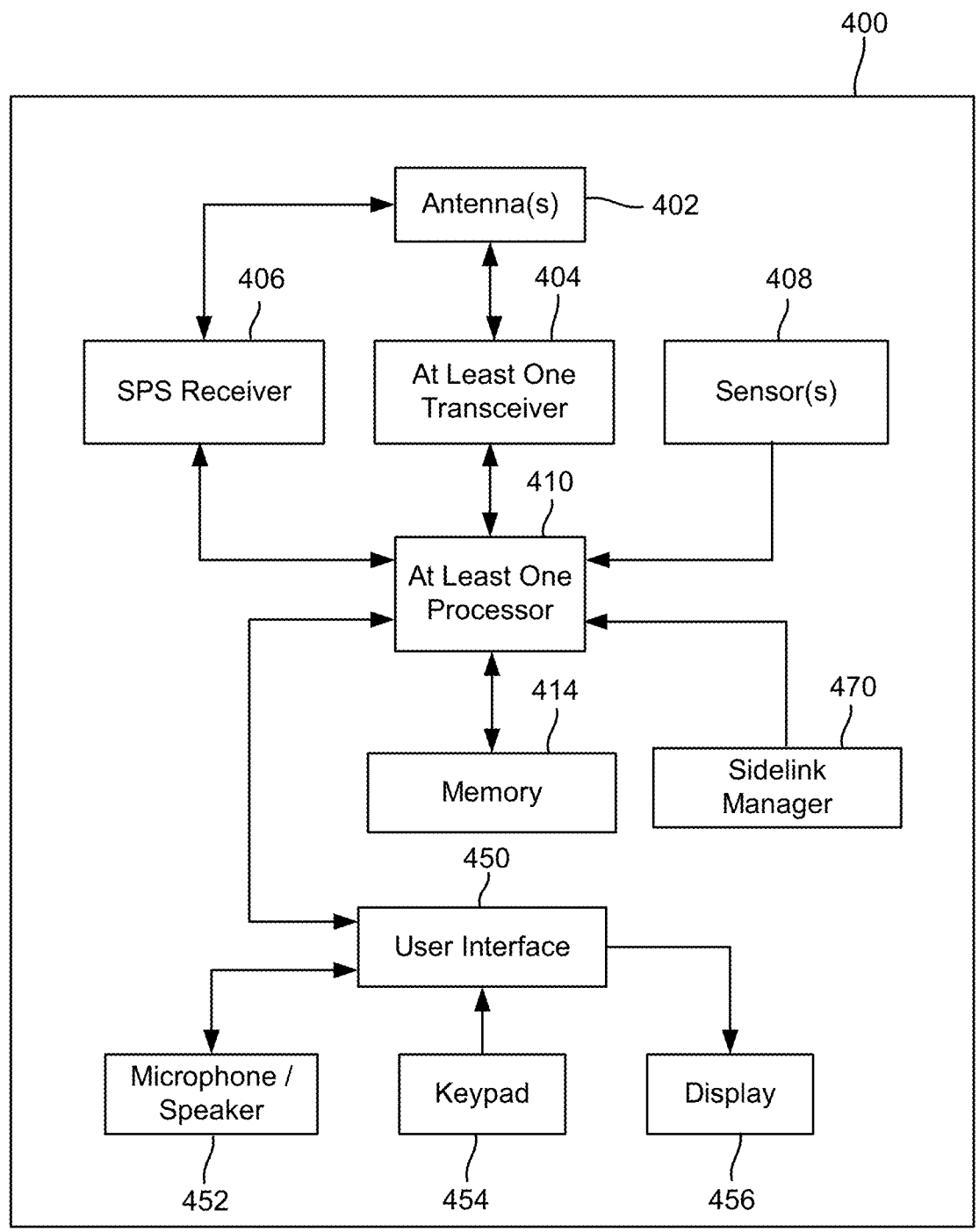
FIG. 4 is a block diagram illustrating various components of an example UE, according aspects of the disclosure.

FIG. 4 is a block diagram illustrating various components of an example UE 400, according to aspects of the disclosure. In an aspect, the UE 400 may correspond to any of the UEs described herein. As a specific example, the UE 400 may be a V-UE, such as V-UE 160 in FIG. 1. For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 and providing means for communicating (e.g., means for transmitting, means for receiving, means for measuring, means for tuning, means for refraining from transmitting, etc.) with other network nodes, such as V-UEs (e.g., V-UEs 160), infrastructure access points (e.g., roadside access point 164), P-UEs (e.g., UEs 104), base stations (e.g., base stations 102), etc., via at least one designated RAT (e.g., cV2X or IEEE 802.11p) over one or more communication links (e.g., communication links 120, sidelinks 162, 166, 168, mmW communication link 184). The at least one transceiver 404 may be variously configured for transmitting and encoding signals (e.g., messages, indications, information, and so on), and, conversely, for receiving and decoding signals (e.g., messages, indications, information, pilots, and so on) in accordance with the designated RAT. In an aspect, the at least one transceiver 404 and the antenna(s) 402 may form a (wireless) communication interface of the UE 400.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array, that permits the UE 400 to perform transmit "beamforming," as described herein. Similarly, a receiver may include or be coupled to a plurality of antennas (e.g., antenna(s) 402), such as an antenna array, that permits the UE 400 to perform receive beamforming, as described herein. In an aspect, the transmitter(s) and receiver(s) may share the same plurality of antennas (e.g., antenna(s) 402), such that the UE 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The UE 400 may also include a satellite positioning service (SPS) receiver 406. The SPS receiver 406 may be connected to the one or more antennas 402 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the UE's 400 position using measurements obtained by any suitable SPS algorithm.

One or more sensors 408 may be coupled to at least one processor 410 and may provide means for sensing or detecting information related to the state and/or environment of the UE 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The at least one processor 410 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The at least one processor 410 may therefore provide means for processing, such as means for determining, means for calculating, means for receiving, means for transmitting, means for indicating, etc. The at least one processor 410 may include any form of logic suitable for performing, or causing the components of the UE 400 to perform, at least the techniques described herein.

The at least one processor 410 may also be coupled to a memory 414 providing means for storing (including means for retrieving, means for maintaining, etc.) data and software instructions for executing programmed functionality within the UE 400. The memory 414 may be on-board the at least one processor 410 (e.g., within the same integrated circuit (IC) package), and/or the memory 414 may be external to the at least one processor 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 may provide for voice communication services with the UE 400. The keypad 454 may comprise any suitable buttons for user input to the UE 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the UE 400 may include a sidelink manager 470 coupled to the at least one processor 410. The sidelink manager 470 may be a hardware, software, or firmware component that, when executed, causes the UE 400 to perform the operations described herein. For example, the sidelink manager 470 may be a software module stored in memory 414 and executable by the at least one processor 410. As another example, the sidelink manager 470 may be a hardware circuit (e.g., an ASIC, a field-programmable gate array (FPGA), etc.) within the UE 400.

For sidelink communications among two or more UEs, it is sometimes necessary for a transmitting UE to either increase or decrease its transmit power to improve hearability of the transmitted signal(s) at the receiving UE(s). This is known as transmit power control (TPC). Transmit power may be increased to meet a threshold signal strength at the receiver, or decreased to minimize interference with other transmitters using the frequency spectrum. There are two types of transmit power control, open loop and closed loop. In open loop transmit power control, the transmitting UE determines its transmission power using its own power setting algorithm. There is no feedback input from the receiver. In closed loop transmit power control, the transmitting UE uses feedback from the receiving UE(s) to determine its transmission power. In some cases, the receiving UE may specifically request a certain transmit power. Open loop transmit power control may be used during connection establishment, before the receiving UE(s) can provide feedback to the transmitting UE. Once a sidelink has been established (e.g., as illustrated in FIG. 3), closed loop power control can be used.

As noted above, groups of UEs (e.g., V-UEs 160 in FIG. 1, UEs 204 in FIG. 2, UEs 302 and 304 in FIG. 3) may communicate over a sidelink. If closed/open loop transmit power control is employed for sidelink group communications, the UEs in the group settle (and track) on a transmit power that enables them to communicate with the other UEs in the group. In general, the active (transmitting and/or receiving) group members may or may not be known to all UEs in the group. Specifically, the active group members may be known to all UEs in the group, as may be the case in a closed group. Alternatively, in the case of an open group, the active group members may not be known to all UEs in the group. As another alternative, the active group members may only be known to the group leader, which may be the case in open and closed groups.

An issue related to transmit power control procedures for sidelink group communications is how to admit new UEs into the group. For example, there needs to be a mechanism for a non-member UE to discover the presence of the group. If a group announcement discovery procedure is used, then it needs to be determined which member UE(s) send the group announcement and with what transmit power. When a new UE joins the group, it will trigger a re-evaluation of the transmit power selection at the existing member UEs to reach this new member UE.

Accordingly, the present disclosure provides techniques for sidelink group management for transmit power-controlled group communications. The techniques of the present disclosure assume that a sidelink group communication session exists among a group of UEs. A group leader may or may not exist. Further, the transmit power control procedures are assumed to have settled for the existing group members, and the member UEs have determined a transmit power to use for their sidelink transmissions that will reach all the other UEs (or a given subset of those UEs) in the group.

In an aspect, the group of UEs determines one or more UEs in the group to periodically transmit group presence announcement messages, as well as a transmit power that the one or more UEs should use for those group presence announcements. A group presence announcement message should include at least an identifier specific to the group. In an aspect, the group identifier may be a Layer 2 (i.e., access stratum layer) group identifier. Alternatively, in another aspect, the group identifier may be an application layer group identifier. A group presence announcement message may be an application layer message, an NAS layer (e.g., a V2X layer) message, or an RRC layer message. More specifically, the type of message depends on which layer is controlling the group announcements and/or group management. For example, a group presence announcement message may be an RRC layer message if the sidelink communications group is an open group, as RRC will likely be more efficient in that case. As another example, a group presence announcement message may be an application layer message if the sidelink communications group is a closed group, as group management may be controlled at the application layer level in that case. A group presence announcement message may be sent over a physical sidelink discovery channel (PSDCH) or one or more sidelink communications physical channels (e.g., physical sidelink control channel (PSCCH) and/or physical sidelink shared channel (PSSCH)).

In an aspect, all of the UEs in the sidelink communications group may transmit the group presence announcement messages. For example, if there is no group leader, then every UE can transmit group presence announcement messages. In an aspect, group presence announcement messages may be synchronized transmissions among all of the UEs. For example, the group presence announcement messages may be aligned on a system frame number (SFN). This is helpful to reduce the resource overhead associated with the transmission of group presence announcement messages, and when there is no specific requirements on the spatial directivity of the transmissions (e.g., in FR1).

In an aspect, instead of some or all of the group members transmitting group presence announcement messages, only the group leader transmits group presence announcement messages.

In an aspect, the group leader may select a subset of the UEs in the sidelink communications group to transmit group presence announcement messages. The group leader may also provide a configuration for group presence announcement message transmissions, including at least a periodicity and a time offset among the selected UE(s). The group leader may stagger the time offset configuration(s) for the selected UE(s) such that the equivalent periodicity of the group presence announcement message transmissions from the perspective of the group are reduced by a factor of the number of UEs selected. For example, if the group leader determines that group presence announcement messages should be transmitted every one second and selects two UEs to transmit group presence announcement messages, each selected UE would transmit a group presence announcement message every two seconds.

In an aspect, the subset of the UEs selected to transmit group presence announcement messages may be based, at least in part, on signal strength measurements (e.g., RSRP, RSRQ) between the UEs in the sidelink communications group. In an aspect, the group leader can select a UE if the signal strength of a transmission from that UE to one or more of the other UEs in the group is below a configured threshold. Specifically, if a UE is well-connected to all or most other UEs in the group, as indicated by a high RSRP associated with that UE, then it may not be at the edge of the group, but rather, more centrally located. However, if the signal strength associated with a UE or a subset of UEs is low (i.e., below some threshold), then it is possible that that UE or subset of UEs is located on the edge of the group. In that case, it would be beneficial for that UE/subset of UEs to broadcast group presence announcement messages, as they are more likely to be heard by non-group UEs outside of, or further from, the geographic location of the sidelink communications group.

In an aspect, similar to the above, the group leader can select a UE or a subset of UEs to broadcast group presence announcement messages if the signal strength of transmissions from that UE on one or more transmit beams to one or more of the other UEs in the group is below a configured threshold. The signal strength of transmissions from a UE may be determined by a receiving UE using either any receive beam or the best receive beam to receive such transmissions. If the sidelink communications group is operating in mmW (e.g., FR2), the selected UE(s) may transmit the group presence announcement messages in a beamformed manner using multiple transmit beams. In this case, the selected UEs should be selected not based only on the signal strength of a given transmit beam, but the signal strength of multiple transmit beams.

In an aspect, a UE transmitting group presence announcement messages may determine the transmit power for a group presence announcement message transmission based, at least in part, on (1) a transmit power configuration that the UE is using to transmit other sidelink physical channels to the group members, (2) a downlink pathloss measurement to a serving base station, (3) a sidelink pathloss to a group leader (if there is one), (4) a transmit power configuration received from the group leader (if there is one), and/or (5) a maximum transmit power configuration for the UE that does not exceed the UE's maximum transmit power capability.

The transmit power configuration received from the group leader (option (4) above) may include a maximum transmit power to use for group presence announcement message transmissions and/or an upper bound on the incremental transmit power increase that the UE may use beyond the transmit power it is using for sidelink transmissions to other group members. This option may be used in the following example scenario. In the example scenario, sidelink transmit power control is used within the sidelink communications group. Further, the group leader determines the maximum transmit power the members of the group can use based on pathloss measurements to a serving base station (which may be serving all, or at least most, of the member UEs). That is, interference from uplink UE transmissions at the base station are being managed only by the group leader, instead of each member individually. As a sidelink communications group is local (i.e., the member UEs are within wireless communication range of each other, and therefore likely a relatively small geographic area), using only measurements from the group leader should be sufficient, as they would likely be nearly the same for all other member UEs. In such an example scenario, the group leader can determine how much of an incremental increase in the transmit power the selected UE(s) can use beyond the transmit power used for normal sidelink communications within the group.

In an aspect, the UE transmitting the group presence announcement messages may determine one or more transmit spatial configurations (i.e., transmit beams) to use for the group presence messages. The chosen transmit spatial configurations may include at least the transmit beams that have been determined to be "not good" transmit beams for communicating with other group members. In particular, the UE may determine the set of transmit beams (transmit spatial configurations) for which the signal strength measured by one or more of the other member UEs is below a configured threshold, meaning that the set of transmit beams includes beams that are likely not directed at the member UEs. The UE may transmit the group presence announcement messages using one or more of the transmit beams in the determined set. The assumption is that by selecting one or more transmit beams that are not directed at the other UEs in the sidelink communications group, the transmit beams are more likely to be detected by UEs that are not members of the group.

Figure 5:
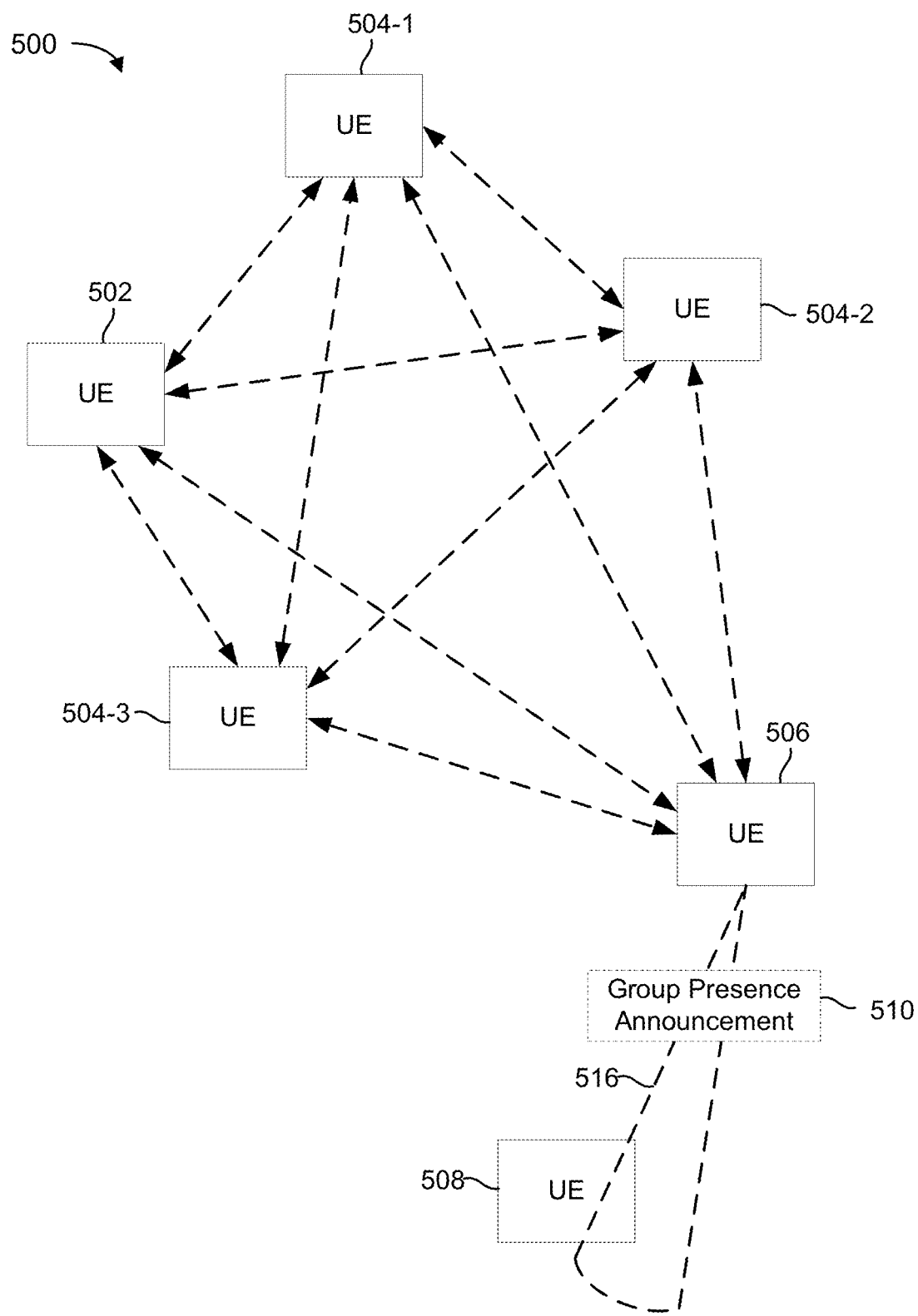
FIG. 5 illustrates an example wireless communications system, according to aspects of the disclosure.

FIG. 5 illustrates an example wireless communications system 500, according to aspects of the disclosure. In the example of FIG. 5, a group of UEs (illustrated as UEs 502, 504, and 506) have formed a sidelink communications group. The member UEs may communicate among each other over various sidelinks, illustrated by dashed arrows, which may correspond to sidelinks 162 and/or 168 in FIG. 1 or sidelink 330 in FIG. 3. In the example of FIG. 5, the UE 502 is the group leader, and the UE 506 has been selected, or otherwise determined, to be the UE that transmits group presence announcement messages. The remaining UEs 504-1, 504-2, and 504-3 (collectively, UEs 504) are member UEs that are not the group leader and do not transmit group presence announcement messages. Note, however, that there may not be a group leader, or the group leader may transmit group presence announcement messages rather than any of the other UEs.

To differentiate among the UEs illustrated in FIG. 5, the UE 502 may be referred to herein as the group leader UE 502, the UEs 504 may be referred to as regular member UEs 504, and the UE 506 may be referred to as the transmitting UE 506. As will be appreciated, there may be more or fewer regular member UEs 504 than the three illustrated in FIG. 5, and there may be more transmitting UEs 506 that the one illustrated in FIG. 5.

In an aspect, the transmitting UE 506 may have been selected/determined based on having a signal strength to one or more other UEs 504/502 that is less than a threshold (which may be configured by the group leader UE 502, the serving base station, a network entity, the applicable standard, etc.). For example, given its distance from regular member UE 504-1, the signal strength of sidelink transmissions received at the regular member UE 504-1 may be less than the threshold, and based on that determination, the transmitting UE 506 is selected to transmit group presence announcement messages. As can be seen in the example of FIG. 5, the lower signal strength of transmissions from the transmitting UE 506 to the regular member UE 504-1 indicates that the transmitting UE 506 is on the edge of the sidelink communications group.

In an aspect, the UEs 502, 504, and 506 in FIG. 5 may operate in a mmW frequency range (e.g., FR2), and may therefore use beamforming (transmit and receive) to communicate over the illustrated sidelinks. In this case, the transmitting UE 506 may be selected/determined based on the signal strength of beamformed transmissions from the transmitting UE 506 to one or more of the other UEs 502/506 being below a threshold. As above, the threshold may be configured by the group leader UE 502, the serving base station, a network entity, the applicable standard, etc. For example, given its distance from regular member UE 504-1, the signal strength of beamformed sidelink transmissions received at the regular member UE 504-1 may be less than the threshold. The signal strength may be determined by the regular member UE 504-1 using any receive beam or the best receive beam to receive sidelink transmissions from the transmitting UE 506.

Once selected/determined, the transmitting UE 506 periodically transmits group presence announcement messages 510. If operating in FR1, the transmitting UE 506 may transmit group presence announcement messages 510 omnidirectionally. Alternatively, if operating in a mmW frequency range, the transmitting UE 506 may transmit the group presence announcement messages in a beamformed manner using one or more transmit beams. The one or more transmit beams may include at least one transmit beam that has a received signal strength at one or more of the other UEs 502/504 in the group that is lower than a threshold determined to be acceptable for communicating with the other group members. For example, the transmitting UE 506 may select transmit beam 516 to transmit group presence announcement messages 510. As shown in FIG. 5, the transmit beam 516 would be a poor choice for communicating with the other UEs in the sidelink communications group, which is why it was selected, but may provide sufficient received signal strength at a non-member UE 508 to be detectable by the non-member UE 508.

Figure 6:
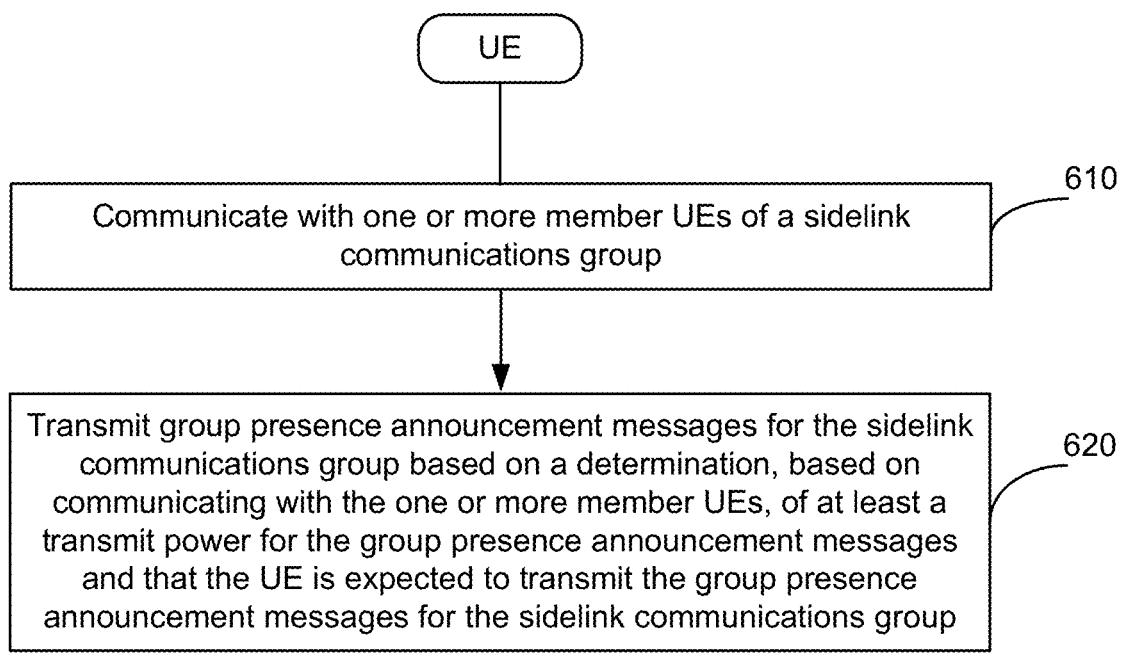
FIG. 6 illustrates an example method for wireless communication, according to aspects of the disclosure.

FIG. 6 illustrates an example method 600 for wireless communication, according to aspects of the disclosure. In an aspect, the method 600 may be performed by a UE participating in a sidelink communications group (e.g., any of the UEs described herein). In a specific example, the UE may correspond to transmitting UE 506 in FIG. 5.

At 610, the UE communicates with one or more member UEs (e.g., UEs 502 and 504 in FIG. 5) of the sidelink communications group. In an aspect, operation 610 may be performed by the at least one transceiver 404, the at least one processor 410, memory 414, and/or sidelink manager 470, any or all of which may be considered means for performing this operation.

At 620, the UE transmits group presence announcement messages for the sidelink communications group based on a determination, based on communicating with the one or more member UEs, of at least a transmit power for the group presence announcement messages and that the UE is expected to transmit the group presence announcement messages for the sidelink communications group. In an aspect, operation 620 may be performed by the at least one transceiver 404, the at least one processor 410, memory 414, and/or sidelink manager 470, any or all of which may be considered means for performing this operation.

As will be appreciated, a technical advantage of the method 600 is increased efficiency for determining the transmit power control within a group of UEs connected over a sidelink.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method for wireless communication performed by a user equipment (UE) participating in a sidelink communications group, comprising: communicating with one or more member UEs of the sidelink communications group; determining, based on communicating with the one or more member UEs, that the UE should transmit group presence announcement messages for the sidelink communications group and at least a transmit power for the group presence announcement messages; and transmitting the group presence announcement messages based on the determination.

Clause 2. The method of clause 1, wherein the determining comprises: receiving, from a group leader UE for the sidelink communications group, an indication to transmit the group presence announcement messages.

Clause 3. The method of clause 2, wherein the indication includes a periodicity and a time offset for the group presence announcement messages.

Clause 4. The method of clause 3, wherein the time offset is staggered from time offsets of group presence announcement message transmissions from other member UEs of the sidelink communications group.

Clause 5. The method of any of clauses 3 to 4, wherein the UE transmits the group presence announcement messages periodically based on the received periodicity.

Clause 6. The method of any of clauses 1 to 5, wherein: the UE is a group leader UE for the sidelink communications group, and the determination that the UE should transmit the group presence announcement messages is based on the UE being the group leader UE.

Clause 7. The method of any of clauses 1 to 6, wherein: all member UEs of the sidelink communications group transmit the group presence announcement messages, and the determination that the UE should transmit the group presence announcement messages is based on the UE being a member of the sidelink communications group.

Clause 8. The method of any of clauses 1 to 7, wherein the determination that the UE should transmit the group presence announcement messages is based on received signal strength measurements of transmissions from the UE to the one or more member UEs being less than a threshold.

Clause 9. The method of clause 8, wherein the threshold is received from a group leader UE of the sidelink communications group or a base station serving the UE, or specified in a cellar communications standard.

Clause 10. The method of any of clauses 1 to 9, wherein the transmissions from the UE to the one or more member UEs are beamformed transmissions.

Clause 11. The method of any of clauses 1 to 10, further comprising: determining a set of transmit beams that have received signal strength measurements at the one or more member UEs that are less than a threshold; and selecting at least one transmit beam from the set of transmit beams to use to transmit the group presence announcement messages, wherein transmitting the group presence announcement messages comprises transmitting the group presence announcement messages on the at least one transmit beam.

Clause 12. The method of clause 11, wherein the set of transmit beams having received signal strength measurements that are less than the threshold indicates that the set of transmit beams are not suitable for communication with the one or more member UEs.

Clause 13. The method of any of clauses 1 to 12, wherein the transmit power is determined based on: a transmit power configuration that the UE is using to transmit other sidelink physical channels to the one or more member UEs, a downlink pathloss measurement to a serving base station, a sidelink pathloss to a group leader UE for the sidelink communications group, a transmit power configuration received from the group leader UE, a maximum transmit power configuration for the UE that does not exceeds a maximum transmit power capability of the UE, or any combination thereof.

Clause 14. The method of clause 13, wherein the transmit power configuration received from the group leader UE includes: a maximum transmit power to use for the group presence announcement messages, and/or an upper bound on an incremental transmit power increase that the UE is expected to use beyond the transmit power configuration that the UE is using to transmit the other sidelink physical channels to the one or more member UEs.

Clause 15. The method of any of clauses 1 to 14, wherein the group presence announcement messages include a group identifier of the sidelink communications group.

Clause 16. The method of clause 15, wherein: the group identifier is an access stratum layer group identifier, or the group identifier is an application layer group identifier.

Clause 17. The method of any of clauses 1 to 16, wherein the group presence announcement messages comprise: application layer message, non-access stratum layer messages, or radio resource control (RRC) messages.

Clause 18. The method of any of clauses 1 to 17, wherein the group presence announcement messages are transmitted over a physical sidelink discovery channel (PSDCH), a physical sidelink control channel (PSCCH), or a physical sidelink shared channel (PSSCH).

Clause 19. An apparatus comprising a memory and at least one processor communicatively coupled to the memory, the memory and the at least one processor configured to perform a method according to any of clauses 1 to 18.

Clause 20. An apparatus comprising means for performing a method according to any of clauses 1 to 18.

Clause 21. A non-transitory computer-readable medium storing computer-executable instructions, the computer-executable comprising at least one instruction for causing a computer or processor to perform a method according to any of clauses 1 to 18.

Additional implementation examples are described in the following numbered clauses:

Clause 1. A method for wireless communication performed by a user equipment (UE) participating in a sidelink communications group, comprising: communicating with one or more member UEs of the sidelink communications group; and transmitting group presence announcement messages for the sidelink communications group based on a determination, based on communicating with the one or more member UEs, of at least a transmit power for the group presence announcement messages and that the UE is expected to transmit group presence announcement messages for the sidelink communications group.

Clause 2. The method of clause 1, further comprising: receiving, from a group leader UE for the sidelink communications group, an indication to transmit the group presence announcement messages.

Clause 3. The method of clause 2, wherein the indication includes a periodicity and a time offset for the group presence announcement messages.

Clause 4. The method of clause 3, wherein the time offset is staggered from time offsets of group presence announcement message transmissions from other member UEs of the sidelink communications group.

Clause 5. The method of any of clauses 3 to 4, wherein the UE transmits the group presence announcement messages periodically based on the periodicity.

Clause 6. The method of any of clauses 1 to 5, wherein: the UE is a group leader UE for the sidelink communications group, and the determination that the UE is expected to transmit the group presence announcement messages is further based on the UE being the group leader UE.

Clause 7. The method of any of clauses 1 to 6, wherein: all member UEs of the sidelink communications group transmit the group presence announcement messages, and the determination that the UE is expected to transmit the group presence announcement messages is further based on the UE being a member of the sidelink communications group.

Clause 8. The method of any of clauses 1 to 7, wherein the determination that the UE is expected to transmit the group presence announcement messages is further based on received signal strength measurements of transmissions from the UE to the one or more member UEs being less than a threshold, or received signal strength measurements of transmissions from the one or more member UEs to the UE being less than the threshold, or both.

Clause 9. The method of clause 8, further comprising: receiving the threshold from a group leader UE of the sidelink communications group or a base station serving the UE.

Clause 10. The method of any of clauses 1 to 9, wherein transmissions from the UE to the one or more member UEs are beamformed transmissions.

Clause 11. The method of any of clauses 1 to 10, further comprising: determining a set of transmit beams that have received signal strength measurements at the one or more member UEs that are less than a threshold; and selecting at least one transmit beam from the set of transmit beams to use to transmit the group presence announcement messages, wherein the transmitting comprises transmitting the group presence announcement messages on the at least one transmit beam.

Clause 12. The method of clause 11, wherein the set of transmit beams having received signal strength measurements that are less than the threshold indicates that the set of transmit beams are not suitable for communication with the one or more member UEs.

Clause 13. The method of any of clauses 1 to 12, wherein the transmit power is determined based on: a transmit power configuration that the UE is using to transmit other sidelink physical channels to the one or more member UEs, a downlink pathloss measurement to a serving base station, a sidelink pathloss to a group leader UE for the sidelink communications group, a transmit power configuration received from the group leader UE, a maximum transmit power configuration for the UE that does not exceeds a maximum transmit power capability of the UE, or any combination thereof.

Clause 14. The method of clause 13, wherein the transmit power configuration received from the group leader UE includes: a maximum transmit power to use for the group presence announcement messages, an upper bound on an incremental transmit power increase that the UE is expected to use beyond the transmit power configuration that the UE is using to transmit the other sidelink physical channels to the one or more member UEs, or any combination thereof.

Clause 15. The method of any of clauses 1 to 14, wherein the group presence announcement messages include a group identifier of the sidelink communications group.

Clause 16. The method of clause 15, wherein: the group identifier is an access stratum layer group identifier, or the group identifier is an application layer group identifier.

Clause 17. The method of any of clauses 1 to 16, wherein the group presence announcement messages comprise: application layer messages, non-access stratum (NAS) layer messages, or radio resource control (RRC) messages.

Clause 18. The method of any of clauses 1 to 17, wherein the UE transmits the group presence announcement messages over a physical sidelink discovery channel (PSDCH), a physical sidelink control channel (PSCCH), or a physical sidelink shared channel (PSSCH).

Clause 19. An apparatus comprising a memory and at least one processor communicatively coupled to the memory, the memory and the at least one processor configured to perform a method according to any of clauses 1 to 18.

Clause 20. An apparatus comprising means for performing a method according to any of clauses 1 to 18.

Clause 21. A non-transitory computer-readable medium storing computer-executable instructions, the computer-executable comprising at least one instruction for causing a computer or processor to perform a method according to any of clauses 1 to 18.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for wireless communication performed by a user equipment (UE) participating in a sidelink communications group, comprising:
   communicating with one or more member UEs of the sidelink communications group; and
   transmitting group presence announcement messages for the sidelink communications group based on a determination, based on communicating with the one or more member UEs, of at least a transmit power for the group presence announcement messages and that the UE is expected to transmit the group presence announcement messages for the sidelink communications group, wherein the UE is one of a subset of members of the sidelink communications group that transmits the group presence announcement messages for the sidelink communications group.

2. The method of claim 1, further comprising:
   receiving, from a group leader UE for the sidelink communications group, an indication to transmit the group presence announcement messages.

3. The method of claim 2, wherein the indication includes a periodicity and a time offset for the group presence announcement messages.

4. The method of claim 3, wherein the time offset is staggered from time offsets of group presence announcement message transmissions from other member UEs of the sidelink communications group.

5. The method of claim 3, wherein the UE transmits the group presence announcement messages periodically based on the periodicity.

6. The method of claim 1, wherein:
   the UE is a group leader UE for the sidelink communications group, and
   the determination that the UE is expected to transmit the group presence announcement messages is further based on the UE being the group leader UE.

7. The method of claim 1, wherein:
   all member UEs of the sidelink communications group transmit the group presence announcement messages, and
   the determination that the UE is expected to transmit the group presence announcement messages is further based on the UE being a member of the sidelink communications group.

8. The method of claim 1, wherein the determination that the UE is expected to transmit the group presence announcement messages is further based on received signal strength measurements of transmissions from the UE to the one or more member UEs being less than a threshold, or received signal strength measurements of transmissions from the one or more member UEs to the UE being less than the threshold, or both.

9. The method of claim 8, further comprising:
   receiving the threshold from a group leader UE of the sidelink communications group or a base station serving the UE.

10. The method of claim 1, wherein transmissions from the UE to the one or more member UEs are beamformed transmissions.

11. The method of claim 1, further comprising:
determining a set of transmit beams that have received signal strength measurements at the one or more member UEs that are less than a threshold; and
selecting at least one transmit beam from the set of transmit beams to use to transmit the group presence announcement messages,
wherein transmitting the group presence announcement messages comprises transmitting the group presence announcement messages on the at least one transmit beam.

12. The method of claim 11, wherein the set of transmit beams having received signal strength measurements that are less than the threshold indicates that the set of transmit beams are not suitable for communication with the one or more member UEs.

13. The method of claim 1, wherein the transmit power is determined based on:
a transmit power configuration that the UE is using to transmit other sidelink physical channels to the one or more member UEs,
a downlink pathloss measurement to a serving base station,
a sidelink pathloss to a group leader UE for the sidelink communications group,
a transmit power configuration received from the group leader UE,
a maximum transmit power configuration for the UE that does not exceeds a maximum transmit power capability of the UE, or
any combination thereof.

14. The method of claim 13, wherein the transmit power configuration received from the group leader UE includes:
a maximum transmit power to use for the group presence announcement messages,
an upper bound on an incremental transmit power increase that the UE is expected to use beyond the transmit power configuration that the UE is using to transmit the other sidelink physical channels to the one or more member UEs, or
any combination thereof.

15. The method of claim 1, wherein the group presence announcement messages include a group identifier of the sidelink communications group.

16. The method of claim 15, wherein:
the group identifier is an access stratum layer group identifier, or
the group identifier is an application layer group identifier.

17. The method of claim 1, wherein the group presence announcement messages comprise:
application layer messages,
non-access stratum (NAS) layer messages, or
radio resource control (RRC) messages.

18. The method of claim 1, wherein the UE transmits the group presence announcement messages over a physical sidelink discovery channel (PSDCH), a physical sidelink control channel (PSCCH), or a physical sidelink shared channel (PSSCH).

19. A user equipment (UE), comprising:
a memory;
a communication interface; and
at least one processor communicatively coupled to the memory and the communication interface, the at least one processor configured to:
communicate with one or more member UEs of a sidelink communications group in which the UE is participating; and
cause the communication interface to transmit group presence announcement messages for the sidelink communications group based on a determination, based on communication with the one or more member UEs, of at least a transmit power for the group presence announcement messages and that the UE is expected to transmit the group presence announcement messages for the sidelink communications group, wherein the UE is one of a subset of members of the sidelink communications group that transmits the group presence announcement messages for the sidelink communications group.

20. The UE of claim 19, wherein the at least one processor is further configured to:
receive, via the communication interface, from a group leader UE for the sidelink communications group, an indication to transmit the group presence announcement messages.

21. The UE of claim 20, wherein the indication includes a periodicity and a time offset for the group presence announcement messages.

22. The UE of claim 21, wherein the time offset is staggered from time offsets of group presence announcement message transmissions from other member UEs of the sidelink communications group.

23. The UE of claim 19, wherein:
the UE is a group leader UE for the sidelink communications group, and
the determination that the UE is expected to transmit the group presence announcement messages is further based on the UE being the group leader UE.

24. The UE of claim 19, wherein:
all member UEs of the sidelink communications group transmit the group presence announcement messages, and
the determination that the UE is expected to transmit the group presence announcement messages is further based on the UE being a member of the sidelink communications group.

25. The UE of claim 19, wherein the determination that the UE is expected to transmit the group presence announcement messages is further based on received signal strength measurements of transmissions from the UE to the one or more member UEs being less than a threshold, or received signal strength measurements of transmissions from the one or more member UEs to the UE being less than the threshold, or both.

26. The UE of claim 19, wherein the at least one processor is further configured to:
determine a set of transmit beams that have received signal strength measurements at the one or more member UEs that are less than a threshold; and
select at least one transmit beam from the set of transmit beams to use to transmit the group presence announcement messages,
wherein the at least one processor being configured to transmit the group presence announcement messages comprises the at least one processor being configured to transmit the group presence announcement messages on the at least one transmit beam.

27. The UE of claim 19, wherein the transmit power is determined based on:
a transmit power configuration that the UE is using to transmit other sidelink physical channels to the one or more member UEs,
a downlink pathloss measurement to a serving base station, a sidelink pathloss to a group leader UE for the sidelink communications group,
a transmit power configuration received from the group leader UE,
a maximum transmit power configuration for the UE that does not exceeds a maximum transmit power capability of the UE, or
any combination thereof.

28. The UE of claim 27, wherein the transmit power configuration received from the group leader UE includes:
a maximum transmit power to use for the group presence announcement messages,
an upper bound on an incremental transmit power increase that the UE is expected to use beyond the transmit power configuration that the UE is using to transmit the other sidelink physical channels to the one or more member UEs, or
any combination thereof.

29. A user equipment (UE), comprising:
means for communicating with one or more member UEs of a sidelink communications group; and
means for transmitting group presence announcement messages for the sidelink communications group based on a determination, based on communicating with the one or more member UEs, of at least a transmit power for the group presence announcement messages and that the UE is expected to transmit the group presence announcement messages for the sidelink communications group, wherein the UE is one of a subset of members of the sidelink communications group that transmits the group presence announcement messages for the sidelink communications group.

30. A non-transitory computer-readable medium storing computer-executable instructions that, when executed by a user equipment (UE), cause the UE to:
communicate with one or more member UEs of a sidelink communications group; and
transmit group presence announcement messages for the sidelink communications group based on a determination, based on communicating with the one or more member UEs, of at least a transmit power for the group presence announcement messages and that the UE is expected to transmit the group presence announcement messages for the sidelink communications group, wherein the UE is one of a subset of members of the sidelink communications group that transmits the group presence announcement messages for the sidelink communications group.

* * * * *